US011628647B2

(12) United States Patent
Cho et al.

(10) Patent No.: US 11,628,647 B2
(45) Date of Patent: Apr. 18, 2023

(54) SYNTHETIC LEATHER FOR STEERING WHEEL COVER HAVING IMPROVED DURABILITY AND METHOD FOR PREPARING THE SAME

(71) Applicants: Hyundai Motor Company, Seoul (KR); Kia Motors Corporation, Seoul (KR); Baiksan Co., Ltd., Gyeonggi-Do (KR)

(72) Inventors: Hyun Dae Cho, Gyeonggi-Do (KR); Oh Deok Kwon, Gyeonggi-Do (KR); Won Jin Seo, Gyeonggi-Do (KR); Kie Youn Jeong, Gyeonggi-Do (KR); Yoon Jong Cha, Incheon (KR); Sung Deuk Ahn, Gyeonggi-Do (KR); Tae Ho Hyun, Gyeonggi-Do (KR)

(73) Assignees: Hyundai Motor Company, Seoul (KR); Kia Motors Corporation, Seoul (KR); Baiksan Co., Ltd., Siheung (KR)

( * ) Notice: Subject to any disclaimer, the term of this patent is extended or adjusted under 35 U.S.C. 154(b) by 394 days.

(21) Appl. No.: 16/928,363

(22) Filed: Jul. 14, 2020

(65) Prior Publication Data

US 2020/0361177 A1 Nov. 19, 2020

Related U.S. Application Data

(62) Division of application No. 14/886,580, filed on Oct. 19, 2015, now Pat. No. 10,744,740.

(30) Foreign Application Priority Data

Nov. 7, 2014 (KR) ........................ 10-2014-0154261

(51) Int. Cl.
*B32B 5/02* (2006.01)
*B32B 5/24* (2006.01)
(Continued)

(52) U.S. Cl.
CPC .............. *B32B 5/022* (2013.01); *B29C 41/02* (2013.01); *B29C 41/12* (2013.01); *B29C 41/20* (2013.01);
(Continued)

(58) Field of Classification Search
CPC .... C08G 18/12; C08G 18/3821; C08G 18/44; C08G 18/48; C08G 18/68; D06N 3/0004;
(Continued)

(56) References Cited

U.S. PATENT DOCUMENTS 6,313,335 B1 11/2001 Roberts et al.
6,803,109 B2 10/2004 Qiu et al.
(Continued)

FOREIGN PATENT DOCUMENTS

CN 1285883 A 2/2001
CN 1511989 A 7/2004
(Continued)

OTHER PUBLICATIONS

Geng Yaozong, Modern Waterborne Coatings Process Formulation Application, 2nd ed., China Petrochemical Press, pp. 143-144.

*Primary Examiner* — Philip C Tucker
*Assistant Examiner* — Brian R Slawski
(74) *Attorney, Agent, or Firm* — Fox Rothschild LLP

(57) ABSTRACT

The present invention relates to a synthetic leather for a steering wheel cover of a vehicle, and a method for preparing the same. The synthetic leather including a fiber base layer (101) including a microfiber nonwoven fabric, an urethane porous layer (102) formed on the fiber base layer, a polyurethane resin skin layer (104) formed on the urethane porous layer, and prepared by polymerizing an isocyanate compound and a polyol compound including polycarbonate-
(Continued)

based polyol, fluorine-based polyol and ester-based polyol, and an adhesive layer (103) for adhering the urethane porous layer and the skin layer.

11 Claims, 4 Drawing Sheets

(51) Int. Cl.
| | | |
|---|---|---|
| *B32B 7/12* | (2006.01) | |
| *B29C 41/02* | (2006.01) | |
| *B62D 1/06* | (2006.01) | |
| *B29C 41/20* | (2006.01) | |
| *B32B 5/18* | (2006.01) | |
| *B29C 41/12* | (2006.01) | |
| *B32B 5/08* | (2006.01) | |
| *B32B 27/06* | (2006.01) | |
| *B32B 27/10* | (2006.01) | |
| *B32B 7/06* | (2019.01) | |
| *B32B 27/40* | (2006.01) | |
| *B29K 75/00* | (2006.01) | |
| *B29K 105/04* | (2006.01) | |
| *B29L 31/30* | (2006.01) | |
| *B29L 9/00* | (2006.01) | |
| *B29C 65/00* | (2006.01) | |
| *B29C 65/48* | (2006.01) | |
| *B32B 27/12* | (2006.01) | |

(52) U.S. Cl.
CPC .................. *B32B 5/08* (2013.01); *B32B 5/18* (2013.01); *B32B 5/245* (2013.01); *B32B 7/06* (2013.01); *B32B 7/12* (2013.01); *B32B 27/065* (2013.01); *B32B 27/10* (2013.01); *B62D 1/06* (2013.01); *B29C 65/4835* (2013.01); *B29C 66/45* (2013.01); *B29C 66/723* (2013.01); *B29C 66/727* (2013.01); *B29C 66/7292* (2013.01); *B29C 66/72941* (2013.01); *B29C 66/73941* (2013.01); *B29K 2075/00* (2013.01); *B29K 2105/04* (2013.01); *B29K 2995/0016* (2013.01); *B29K 2995/0058* (2013.01); *B29L 2009/00* (2013.01); *B29L 2031/3047* (2013.01); *B32B 27/12* (2013.01); *B32B 27/40* (2013.01); *B32B 2255/10* (2013.01); *B32B 2255/26* (2013.01); *B32B 2262/0261* (2013.01); *B32B 2262/0276* (2013.01); *B32B 2262/12* (2013.01); *B32B 2266/0278* (2013.01); *B32B 2307/30* (2013.01); *B32B 2307/50* (2013.01); *B32B 2307/714* (2013.01); *B32B 2307/72* (2013.01); *B32B 2307/748* (2013.01); *B32B 2605/003* (2013.01); *B32B 2605/08* (2013.01)

(58) Field of Classification Search
CPC ............. D06N 3/0011; D06N 2211/28; D06N 2211/263; D06N 3/0034; D06N 3/0036; D06N 3/0043; B29C 65/00; B29C 65/48; B29C 65/483; B29C 65/4835; B29C 66/45; B29C 66/71; B29C 66/72; B29C 66/723; B29C 66/727; B29C 66/729; B29C 66/7292; B29C 66/7294; B29C 66/72941; B29C 66/73941; B29C 41/02; B29C 41/12; B29C 41/20; B32B 27/065; B32B 27/12; B32B 27/40; B32B 37/1253; B32B 2266/0278; B32B 2255/10; B32B 2255/26; B32B 2262/0261; B32B 2262/0276; B32B 2262/12; B32B 2307/30; B32B 2307/50; B32B 2307/714; B32B 2307/72; B32B 2307/748; B32B 2605/003; B32B 2605/08; B32B 27/10; B32B 5/022; B32B 5/08; B32B 5/18; B32B 5/245; B32B 7/06; B32B 7/12; B29K 2075/00; B29K 2105/04; B29K 2995/0016; B29K 2995/0058; B29L 2009/00; B29L 2031/3047; B62D 1/04; B62D 1/06
USPC .... 428/151, 423.1, 423.3, 904; 528/65, 370; 156/60, 61, 77, 78, 230, 231, 235, 238, 156/237, 239, 242, 246, 247, 249, 278, 156/280
See application file for complete search history.

(56) References Cited

U.S. PATENT DOCUMENTS

| | | |
|---|---|---|
| 7,282,253 B2 | 10/2007 | Marini et al. |
| 7,704,900 B2 | 4/2010 | Yoshimoto et al. |
| 2002/0041965 A1 | 4/2002 | Hanada et al. |
| 2003/0105263 A1 | 6/2003 | Fan et al. |
| 2003/0139560 A1 | 7/2003 | Konishi et al. |
| 2009/0286436 A1 | 11/2009 | Koide et al. |
| 2009/0311480 A1 | 12/2009 | Fischer et al. |
| 2010/0330333 A1 | 12/2010 | Jokisch et al. |
| 2011/0070422 A1 | 3/2011 | Ammirati et al. |
| 2012/0015574 A1 | 1/2012 | Severich et al. |
| 2014/0170917 A1 | 6/2014 | Jariwala et al. |
| 2015/0354133 A1 | 12/2015 | Yan et al. |
| 2017/0284018 A1 | 10/2017 | You et al. |

FOREIGN PATENT DOCUMENTS

| | | |
|---|---|---|
| CN | 101935449 A | 1/2011 |
| CN | 102089472 A | 6/2011 |
| CN | 102359021 A | 2/2012 |
| CN | 102504189 A | 6/2012 |
| CN | 102517917 A | 6/2012 |
| CN | 102639783 A | 8/2012 |
| CN | 103132344 A | 6/2013 |
| EP | 1 028 186 A1 | 8/2000 |
| EP | 1 431 448 A1 | 6/2004 |
| JP | H0477250 B2 | 12/1992 |
| JP | H06146175 A | 5/1994 |
| JP | H06264371 A | 9/1994 |
| JP | H11507606 A | 7/1999 |
| JP | 2000-086740 A | 3/2000 |
| JP | 2002-054079 A | 2/2002 |
| JP | 2004-084076 A | 3/2004 |
| JP | 2010-042539 A | 2/2010 |
| JP | 2010-150398 A | 7/2010 |
| JP | 2014-001463 A | 1/2014 |
| JP | 2014-098143 A | 5/2014 |
| KR | 10-0504962 B1 | 7/2005 |
| KR | 10-0969041 B1 | 7/2010 |
| KR | 10-1173798 B1 | 8/2012 |
| KR | 10-1204905 B1 | 11/2012 |
| KR | 2012-0133210 A | 12/2012 |
| KR | 2013-0128955 A | 11/2013 |
| KR | 10-1402783 B1 | 6/2014 |
| WO | 2008114284 A1 | 9/2008 |

SYNTHETIC LEATHER FOR STEERING WHEEL COVER HAVING IMPROVED DURABILITY AND METHOD FOR PREPARING THE SAME

CROSS-REFERENCE TO RELATED APPLICATION

This application is a Divisional Application of U.S. application Ser. No. 14/886,580, filed Oct. 19, 2015, now U.S. Pat. No. 10,744,740, which claims under 35 U.S.C. § 119(a) the benefit of Korean Patent Application No. 10-2014-0154261 filed on Nov. 7, 2014, the entire contents of which are incorporated herein by reference.

TECHNICAL FIELD

The present invention relates to a synthetic leather that may be used for interior materials of a vehicle, for example, steering wheel cover. The synthetic leather of the present invention may be improved in durability such as light resistance, heat aging resistance, frictional coloration and chemical resistance, and softness such as a wrinkle property and a volume property.

BACKGROUND

A steering wheel is generally referred to as a wheel or a handle, and is a circular steering apparatus used for changing a direction of progress by turning the wheels of a vehicle to left or right.

A steering wheel delivers rotation operating force of a driver to a steering apparatus through a steering axis binding to the center as a medium, and carries out an operation of angular motioning the wheel. Such a steering wheel has been formed with a circular rim that a driver holds, and a rim support formed in the center of this rim and having a steering axis binding to the center. A steering wheel may be formed with various materials, but may be manufactured using a method of welding a rim support to a rim that forms a metal pipe into a ring shape, or manufactured using a method of casting aluminum or magnesium, a light nonferrous metal having relatively high stiffness. To the rim support part of a steering wheel manufactured as above, an assembly of an air bag, a horn button, an audio operation button and the like are combined after being covered with a cover made of a synthetic resin material, and on the rim, a rim cover made with cloth, synthetic leather, leather and the like covers the surface of the steering wheel.

In conventional processes for preparing synthetic leather, a method of forming a film may be used by applying an urethane skin resin mixing solution containing an organic solvent such as dimethylformamide and methylethyl ketone on a release paper and drying the result, and applying an adhesive on the formed urethane film, and cross-linking and curing the result, and thus prepared skin may be combined with a conventional (short-fiber type) microfiber nonwoven fabric or a woven fabric fiber base.

In the related arts, Korean Patent Application Laid-Open Publication No. 10-2012-0133210 (Patent Document 1) discloses a method for preparing polyurethane synthetic leather for automobile interior materials, and the method for preparing polyurethane synthetic leather includes a first step of preparing a release paper; a second step of forming a surface layer laminated with a plurality of layers by repeatedly applying a polyurethane resin including water-dispersible polycarbonate urethane on the upper surface of the release paper and drying the result a plurality of times; a third step of forming an adhesion layer by applying a solventless-type adhesive on the upper surface of the surface layer; and a fourth step of forming a fabric layer by adhering woven fabric weaved with synthetic fiber, knitwork or nonwoven fabric on the upper surface of the adhesion layer.

However, the synthetic leather manufactured as described above may form a skin coating layer on a fiber base of short-fiber type nonwoven fabric or woven fabric having relatively small density, such that substantial wrinkles may be formed when such synthetic leather is used as a rim cover of a steering wheel, and sew holes may be gaped. Accordingly, there may be limitations in providing softness similar to natural leather volume, feel and the like. In addition, the conventional polyurethane skin coating layer may have light resistance for irradiation amount, which is a physical property for general vehicle sheets and door trims, of about 84 MJ but may not have sufficient light resistance for irradiation amount of about 126 MJ, which is required for steering wheel covering of a vehicle. In addition, physical properties such as chemical resistance, heat aging resistance and frictional coloration may be reduced low, such that application of the synthetic leather as a rim cover of a steering wheel has not been made.

In addition, Korean Patent No. 10-1402783 (Patent Document 2) discloses synthetic leather in which a fiber base layer containing long fiber-type high density microfiber nonwoven fabric; an urethane porous layer having micropores; and a skin layer; are laminated in consecutive order. Such technology has introduced an urethane porous layer having structurally strong binding power on long fiber-type high density microfiber nonwoven fabric thereby complementing hydrolysis resistance, heat resistance, chemical resistance and mechanical properties compared to existing synthetic leather. However, improvements in physical properties of a wrinkle property and fouling resistance may be required in order to be used for a curvy steering wheel cover.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention provides a synthetic leather for interior materials of a vehicle to solve the above-described problems associated with the related art. The inventors of the present invention have identified that, when a microfiber nonwoven fabric according to an exemplary embodiment of the present invention is employed as a fiber base, and a polyol composition used for preparing polyurethane forming a skin layer is controlled, softness similar to natural leather volume, feel and the like may be obtained while improving physical properties such as light resistance, heat aging resistance, frictional coloration and chemical resistance, and particularly, a wrinkle property and fouling resistance may be improved when such material is used for a curvy steering wheel cover.

In one aspect, provided is a synthetic leather that may have improved durability such as light resistance, heat aging resistance, frictional coloration, chemical resistance and fouling resistance, and particularly may have a suitable wrinkle property as having similar softness to natural leather. Accordingly, the synthetic leather may be used for interior materials of a vehicle, for example, for a rim cover of a steering wheel.

In another aspect, provided is a method for preparing a synthetic leather that may have controlled physical properties. The method may comprise laminating an urethane porous layer, an urethane adhesive layer and a polyurethane skin layer in consecutive order on the top of a fiber base layer that is formed of an exemplary microfiber nonwoven fabric according to an exemplary embodiment of the present invention. As such, physical properties may be controlled by forming a polyol component of a polyurethane resin included in each layer.

Furthermore, still provided is a steering wheel that may be covered with the synthetic leather as described herein.

In an exemplary embodiment, the synthetic leather for a steering wheel cover may comprise: a fiber base layer containing long fiber-type high density microfiber nonwoven fabric; an urethane porous layer having micropores; a polyurethane skin layer including a polyurethane resin prepared by polymerizing an isocyanate compound and a polyol compound including polycarbonate-based polyol, fluorine-based polyol and ester-based polyol; and an urethane adhesive layer including an urethane-based adhesive for adhering the urethane porous layer and the skin layer. The fiber base layer, the urethane porous layer, the urethane adhesive layer the polyurethane skin layer may be laminated in consecutive order.

The term "micropores", as used herein, refers to a porous structure comprising a plurality of pores that are embedded in a layer, particularly in the urethane porous layer. Preferably, the micropores may be distributed in entire layer, or at least specific portion of the layer, however, the micropores may not be exposed to a surface or a skin layer. Preferably, the volume of micropores included in the urethane porous layer may be in a range of about 10-80%, of about 15-70%, or particularly, of about 20-60%, based on the total volume of the urethane porous layer.

In an exemplary embodiment, the method for preparing synthetic leather for a steering wheel cover may include: preparing a first sheet by forming an urethane porous layer having micropores on a fiber base layer containing a microfiber nonwoven fabric; forming a polyurethane skin layer by coating a polyurethane composition including a polyurethane resin prepared by polymerizing an isocyanate compound and a polyol compound including polycarbonate-based polyol, fluorine-based polyol and ester-based polyol on a release paper; preparing a second sheet by forming an adhesive layer on the skin layer; and laminating the first sheet and the second sheet and then peeling off the release paper.

Further provided is a steering wheel of a vehicle, and the steering wheel may be covered with the synthetic leather.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 2A is from a conventional microfiber nonwoven fabric and FIG. 2B is from an exemplary microfiber nonwoven fabric according to an exemplary embodiment of the present invention;

Figure 1:
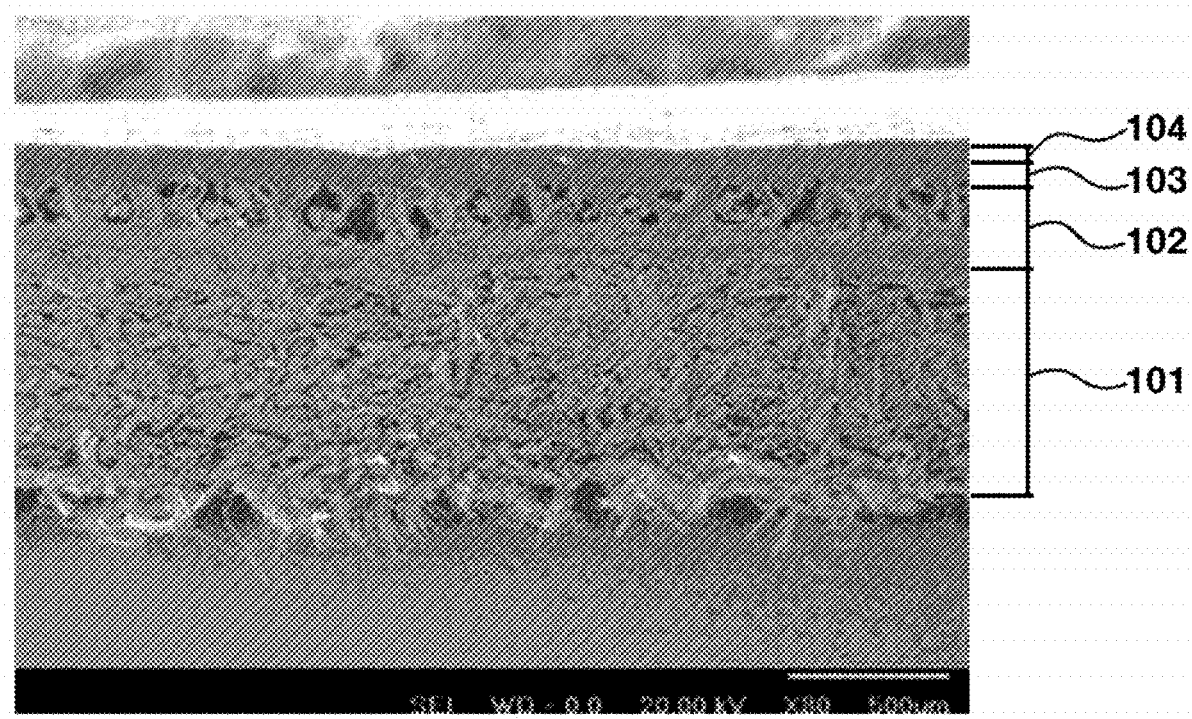
FIG. 1 is a microscopic view observed using a scanning electron microscope (SEM) of a cutting section of an exemplary synthetic leather prepared in Example 1 according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a synthetic leather for a steering wheel cover of a vehicle and a method for preparing the same. The synthetic leather of the present invention may be prepared by laminating an urethane porous layer (102), an urethane adhesive layer (103) and a polyurethane skin layer (104) in consecutive order on the top of a fiber base layer (101) containing a microfiber nonwoven fabric as shown in FIG. 1. Accordingly, physical properties thereof may be controlled to be suitable for a rim cover of a steering wheel of a vehicle by including a novel polyol composition used in the polymerization reaction of a polyurethane resin forming the skin layer (104).

Polyurethane, as generally known in the related arts, may be formed to have two phases in the polymer, that is, a hard segment (HS) and a soft segment (SS). The hard segment phase of polyurethane may play a role of a crystalline structure due to physical binding and may be dispersed into a soft segment phase. Further, physical characteristics and rigidity of polyurethane may be different depending not only on the cohesiveness of the hard segment but on the types of the soft segment, and mechanical properties, thermal characteristics, hydrolysis resistance, chemical resistance and the like may also be different depending on the types of polyol used as the soft segment.

In view of the above, the present invention provides a skin layer (104) of synthetic leather which may particularly include a polyurethane resin prepared by polymerizing an isocyanate compound and a polyol compound including polycarbonate-based polyol, fluorine-based polyol and ester-based polyol together. As a result, effects of improving both required degree of durability for synthetic leather to be used for a steering wheel cover, for example, light resistance, heat aging resistance, frictional coloration, chemical resistance and fouling resistance, and softness, for example, a volume property and a wrinkle property, may be obtained.

According to an exemplary embodiment, a synthetic leather may have a structure in which a fiber base layer (101) containing a microfiber nonwoven fabric; an urethane porous layer (102); an urethane adhesive layer (103); and a polyurethane skin layer (104) and the fiber base layer (101); the urethane porous layer (102); the urethane adhesive layer (103); and the polyurethane skin layer (104) may be laminated in consecutive order.

FIG. 1 is an exemplary scanning electron microscopic (SEM) view showing an exemplary layer structure of an exemplary synthetic leather according to an exemplary embodiment of the present invention.

As shown in FIG. 1, the synthetic leather of the present invention may include: a fiber base layer (101) containing a microfiber nonwoven fabric; an urethane porous layer (102); an urethane adhesive layer (103); and a polyurethane skin layer (104) which may be laminated in consecutive order.

Each layer forming the synthetic leather according to an exemplary embodiment of the present invention is described in more detail as follows.

a) Fiber Base Layer (101)

The fiber base layer (101), as used herein may include a microfiber nonwoven fabric for securing an excellent wrinkle property when used for a curvy steering wheel rim cover while exhibiting similar softness with natural leather.

The microfiber nonwoven fabric of the fiber base layer (101) may be prepared by two or more types of combined processes selected from among a spun bond, a needle punching and a spun lace processes using continuous filaments yarns, which is distinct from a conventional nonwoven fabric using precut stapled fibers. The microfiber nonwoven fabric may have a substantially increased density with apparent density of about 0.35 g/cm$^3$ or greater, of about 0.35 to 0.8 g/cm$^3$, or particularly, of about 0.4 to 0.5 g/cm$^3$, thereby achieving high density without a separate shrinkage process.

Figure 2A:
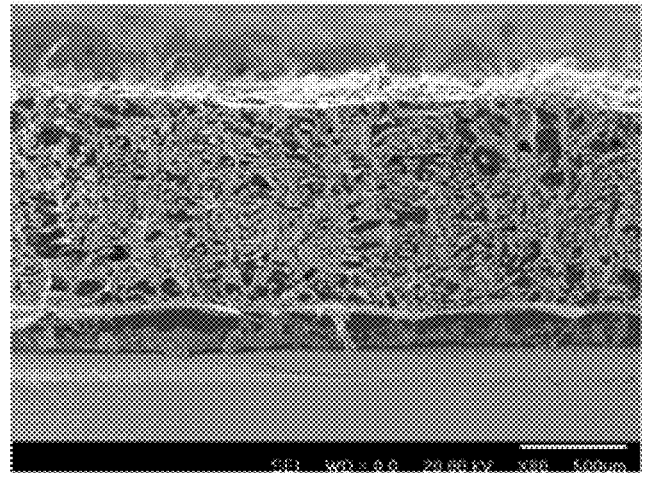
FIGS. 2A-2B are a microscopic view observed using the SEM of a cutting section of nonwoven fabric forming a fiber base layer.
Figure 2B:
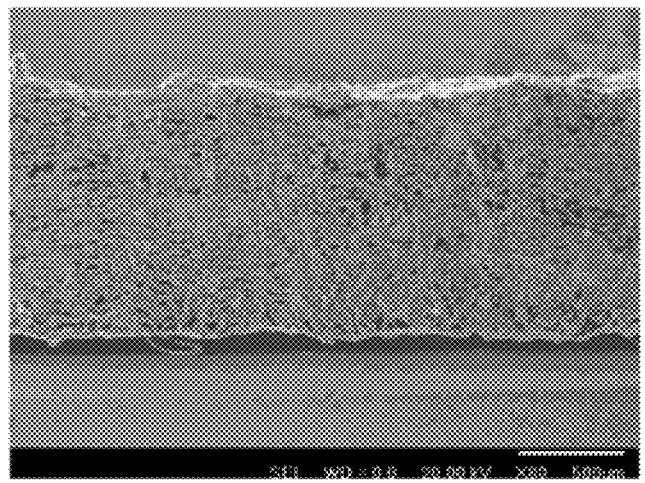

As such, the microfiber nonwoven fabric may exclude processes, such as an immersion process, or immersing and processing low concentration water-dispersible polyurethane may be performed. The microfiber nonwoven fabric having such characteristics may have greater strength and density, and superior quality compared to a conventional nonwoven fabric, such that is the microfiber nonwoven fabric having long-fiber type with greater density may be suitable for a fiber base of synthetic leather. As shown in FIG. 2A, scanning electron microscopy (SEM) view show exemplary internal structures of the conventional nonwoven fabric and in FIG. 2B, an exemplary microfiber nonwoven fabric according to an exemplary embodiment of the present invention are shown.

In addition, the microfiber nonwoven fabric may use one or more filament yarns selected from the group consisting of polyethylene terephthalate (PET) and polyamide (PA); or may use sea-island-type or split-type filament yarn including one or more types selected from the group consisting of polyethylene terephthalate/polyamide (PET/PA), polyethylene terephthalate/polylactic acid (PET/PLA), polyethylene terephthalate/co-polyethylene terephthalate (PET/Co-PET) and polyamide/co-polyethylene terephthalate (PA/Co-PET).

The micro nonwoven fabric may be prepared to include a thermoplastic resin such as polyamide (PA), polyethylene terephthalate (PET) and polytrimethylene terephthalate (PTT) as an island component, and include polylactic acid (PLA) having biodegradability as a sea component. As used herein, the term "island component" refers to a remaining part of a fiber, when the fiber is treated or eluted with solvents or other chemicals. Meanwhile, the term "sea component" refers to a dissolved part during the chemical elution of the fiber.

For example, a web having a density of about 30 to 50 g/cm$^2$ may be formed using a spun bond method with high speed spinning at a speed of about 3,000 to 7,000 m/min. The web may include the island component in an amount of about 60 to 80% by weight, and the sea component in an amount of about 20 to 40% by weight, based on the total weight of the web of the micro nonwoven fabric. For the stability of the web form, calendaring may be carried out using a cold calendaring method treating a surface without applying heat and, based on the required weight, for example, of about 300 to 600 g/cm$^2$, the web may be laminated by, for example, cross lapping and stretched by draft when a high weight is of about 90 g/cm$^2$. Further, penetrations per square centimeter (PPSC) of needle punching may be treated to about 100 to 800 ea/cm$^2$, and hydro treated to prepare long fiber high-density micro nonwoven fabric.

The micro nonwoven fabric may be prepared by conjugate spinning using a thermoplastic resin and a biodegradable resin. For example, the speed may be of about 3,000 to 7,000 m/min, or particularly, of about 4,000 to 7,000 m/min to improve quality. In addition, when polylactic acid (PLA) may be used as the sea component, nonwoven fabric fiber division may be induced using a physical method without using a solvent in the hydro treatment process while preparing the nonwoven fabric. Accordingly, the process may be convenient, and uniform elution may be achieved in the same condition the conventional Co-PET elution condition or in a low concentration such as about 3% or less of aqueous NaOH solution in an elution process thereafter. As such, superior product quality may be obtained since a fiber damage or density decrease may be minimized.

When the microfiber nonwoven fabric according to an exemplary embodiment of the present invention is used as the fiber base layer of the synthetic leather, tensile strength measured in guidance with an ASTM 5035 method is that MD (machine direction) may be of about 40 to 60 kgf/inch and CD (cross direction) may be of about 50 to 60 kgf/inch, or in particular, MD may be of about 42 to 50 kgf/inch and CD may be of about 52 to 58 kgf/inch. In addition, in the microfiber nonwoven fabric, elongation measured in guidance with an ASTM 5035 method is that MD may be of about 60 to 80% and CD may be of about 100 to 140%, or particularly, MD may be of about 65 to 75% and CD may be of about 110 to 130%. In addition, in tear strength measured in guidance with an ASTM 5035 method, MD may be of about 5.5 to 6.0 kgf and CD may be of about 5.2 to 5.8 kgf, or particularly, MD may be of about 5.5 to 5.9 kgf and CD may be of about 5.3 to 5.7 kgf. When elongation is less than the predetermined range, leather tightening may not be sufficient during the preparation of a steering wheel covering thereby causing poor workability and wrinkles in curved parts. When elongation is greater than the predetermined range, the surface may stretch thereby causing non-uniform physical properties and reducing form stability when used for a long period of time. When tear strength is less than the predetermined range, leather fractures may occur during the preparation of a steering wheel covering, and a problem such as sew hole sagging may occur when sewing. Accordingly, a synthetic leather fiber base may have properties in the above range.

Meanwhile, the fiber base layer (101) forming the synthetic leather of the present invention may have an average thickness from about 0.7 to about 1.3 mm.

b) Urethane Porous Layer (102)

The urethane porous layer (102), as used herein, may include uniform pores in a polyurethane resin as shown in FIG. 1, such that the urethane porous layer may further enhance a volume property in the synthetic leather.

The urethane porous layer (102) may be formed by coating an urethane porous layer composition including a polyurethane resin, a solvent, an urethane pore controlling agent and a toner, particularly, in a weight ratio of about 100:about 30-60:about 0.5-2:about 0.1-1:about 5-15 on a surface of the fiber base.

In the urethane porous layer composition, the polyurethane resin may be prepared by reacting a chain extender and a polyurethane prepolymer obtained from polymerizing an isocyanate compound, and a polyol compound containing polyester-based polyol having a weight average molecular weight of about 1,000 to 6,000, polyether-based polyol having a weight average molecular weight of about 1,000 to 6,000 and polycarbonate-based polyol having a weight average molecular weight of about 1,000 to 6,000.

The polymerization method for preparing the polyurethane prepolymer may not be particularly limited to an exemplary method described herein, and any method commonly used for a reaction of polyol and polyisocyanate in the related arts may be used without limitation. Exemplary polymerization method may be emulsion polymerization, suspension polymerization, photopolymerization, bulk polymerization or solution polymerization, with various catalysts, and when necessary, a dispersant, a stabilizing agent, a surfactant, a chain transfer agent, a terminating agent and the like may be added without limitation.

The isocyanate compound used for polymerizing the polyurethane resin may be a general compound used in the related arts, and may not be particularly limited thereto. For example, the isocyanate compound may include at least one selected from the group consisting of aromatic diisocyanate having a benzene ring; aliphatic diisocyanate; alicyclic diisocyanate; and a combination thereof. The aromatic diisocyanate having a benzene ring may be, but not limited to, 2,4- or 2,6-toluene diisocyanate (TDI), 4,4'-diphenylmethane diisocyanate (MDI), xylene diisocyanate (XDI) or 1,5-naphthalene diisocyanate. The aliphatic diisocyanate may be hexamethylene diisocyanate (HDI), propylene diisocyanate, lysine diisocyanate, 2,2,4- or 2,4,4-trimethylhexamethylene diisocyanate. The alicyclic diisocyanate may be 1,4-cyclohexane diisocyanate, isophorone diisocyanate (IPDI) or 4,4'-dicyclohexylmethane diisocyanate ($H_{12}$MDI).

The polyol compound used for polymerizing the polyurethane resin may include polyester-based polyol, polyether-based polyol and polycarbonate-based polyol in a weight ratio of about 10-60:about 20-80:about 5-60, or particularly, in a weight ratio of about 20-40:about 30-65:about 20-50 for enhancing hydrolysis resistance and chemical resistance. In the polymerization, at least one or more of flame retarding polyol such as reactive phosphoric acid ester-based polyol or polyetherester-based polyol may be further included as the polyol component.

The chain extender, as used herein, may be added for the polyurethane resin preparation process and any chain extender generally used in the related arts may be used without particularly limited to an exemplary component in the present invention. For example, a diol compound or a diamine compound having an even number of repeating units may be used for increasing the degree of crystallization. Particularly, the chain extender may be one or more selected from the group consisting of ethylene glycol (EG), diethylene glycol (DEG), propylene glycol (PG), 1,4-butanediol (1,4-BD), 1,6-hexanediol (1,6-HD), neopentyl glycol (NPG) and isophorone diamine (IPDA). Further, the chain extender may be used in an amount of about 1 to 15 parts by weight, or particularly, in an amount of about 2 to 10 parts by weight with respect to 100 parts by weight of the polyol resin.

The amount of the isocyanate compound and the polyol compound used for polymerizing the polyurethane resin may have a NCO/OH molar ratio of about 0.95 to 1.05, or particularly of about 1.0.

In the urethane porous layer composition, the solvent may include one or more selected from among dimethylformamide (DMF), ethyl acetate, tetrahydrofuran, ethylene glycol monoethyl ether and ethylene glycol monoethyl ether acetate, and the solvent may be used in a weight ratio of about 100:about 30-60, or particularly, in a weight ratio of about 100:about 35-45 with respect to the polyurethane resin. Herein, when the amount is less than about 30 weight ratio, uniform pores may not be formed since the viscosity of the solvent is increased, and when the amount is greater than about 60 weight ratio, the viscosity of the solution may be substantially reduced and the thickness may not be precisely adjusted. Accordingly, the solvent may be added in the above-described range.

In the urethane porous layer composition, the urethane pore controlling agent may be for forming uniform pores in the urethane porous layer. The urethane pore controlling agent may not particularly limited, however, one or more surfactants selected from among anion-based and nonion-based may be suitably used. The amount of the urethane pore controlling agent used may be in a weight ratio of about 100:about 0.5-2, or particularly, in a weight ratio of about 100:about 0.5-1.5 with respect to the polyurethane resin. When the amount is less than about 0.5 weight ratio, pores may not be sufficiently formed in the urethane porous layer, and when the amount is greater than about 2 weight ratio, the pores may become non-uniform. Accordingly, the urethane pore controlling agent may be added in the above-described range.

As used herein, in the urethane porous layer composition, the toner may be a pigment providing the color of the urethane porous layer. The amount of the toner used may be in a weight ratio of about 100:about 5-15, or particularly, in a weight of about 100:about 7-12 with respect to the polyurethane resin. When the amount is less than about 5 weight ratio, sufficient color may not be obtained, and when the amount is greater than about 15 weight ratio, overall physical properties of a product may be degraded. Accordingly, the toner may be added in the above-described range.

Thus prepared urethane porous layer of an exemplary synthetic leather according to an exemplary embodiment of the present invention may have modulus of about 60 to 80 kgf/cm$^2$, or particularly of about 60 to 75 kgf/cm$^2$ when measured in guidance with KS M 6782. The tensile strength in the width direction of the urethane porous layer may be of about 370 to 420 kgf/cm$^2$, or particularly, of about 380 to 400 kgf/cm$^2$, and the tensile strength in the length direction of the urethane porous layer may be of about 410 to 450 kgf/cm$^2$, or particularly, of about 420 to 440 kgf/cm$^2$, when measured in guidance with ASTM D-412. In addition, the urethane porous layer may have an elongation in the width direction of about 430 to 480%, or particularly, 440 to 480%, and an elongation in the length direction of about 400 to 450% or particularly, of about 410 to 440% when measured in guidance with JIS K7311.

Meanwhile, the urethane porous layer (102) forming the synthetic leather may have an average thickness of about 0.1 to 0.4 mm.

c) Urethane Adhesive Layer (103)

The synthetic leather of the present invention may further include an adhesive layer (103) between the urethane porous layer (102) and the polyurethane skin layer (104).

The adhesive layer, as used herein, may refer to an adhesives generally used in the related arts and may not be particularly limited thereto. Exemplary adhesive layer may include urethane-based adhesive. In addition, a two-part urethane adhesive, in which a phosphorous and a nitrogen series flame retardant is added, may be used to improve a flame retarding property for the synthetic leather.

Meanwhile, the urethane adhesive layer (103) forming the synthetic leather of the present invention may have an average thickness of about 0.06 to 0.3 mm.

d) Polyurethane Skin Layer (104)

The polyurethane skin layer (104) may be prepared by reacting a chain extender and a polyurethane prepolymer obtained from polymerizing an isocyanate compound and a polyol compound. In particular, the polyol may include polycarbonate-based polyol, fluorine-based polyol and ester-based polyol.

The isocyanate compound which may be used generally in the related art may be used for polymerizing the polyurethane resin included in the polyurethane skin layer (104), which may be described in the urethane porous layer (102), but may not be particularly limited thereto.

The polyol compound used for polymerizing the polyurethane resin may include polycarbonate-based polyol having a weight average molecular weight of about 800 to 3500, fluorine-based polyol having a weight average molecular weight of about 200 to 4000 and ester-based polyol having a weight average molecular weight of about 1000 to 3000. When a polyol compound having a low molecular weight is used, the modulus of the skin layer may increase, and the elongation may decrease thereby causing poor texture on the surface and a rigid product. Meanwhile, when a polyol compound having a high molecular weight is used, stickiness may occur on the surface although the skin layer is soft, and of mechanical property may deteriorate.

The polyol compound used for polymerizing the polyurethane resin may include polycarbonate-based polyol, fluorine-based polyol and ester-based polyol, particularly in a weight ratio of about 70-95:about 1-10:about 1-20. When the ratio of the polyol compound used is the weight ratio described above, high light resistance, hydrolysis resistance, heat aging resistance, frictional coloration, fouling resistance and the like may be obtained.

As the polyol compound, the polycarbonate-based polyol may be a polyol synthesized from generally know synthesis methods in the related arts, for example, a condensation reaction with dihydroxyl compounds and diaryl carbonate, dialkyl carbonate or phosgene. The dihydroxyl compounds may be selected one or more selected from the group consisting of ethylene glycol (EG), diethylene glycol (DEG), triethylene glycol (TEG), propylene glycol (PG), 1,4-butanediol (1,4-BD), 1,3-butanediol (1,3-BD), 1,5-pentanediol (1,5-PD), 1,6-hexanediol (1,6-HD), 1,4-cyclohexanediol, 1,4-cyclohexanedimethanol, 2,2-dimethyl-1,3-propanediol and 1,8-octanediol. Polyurethane prepared using such polycarbonate-based polyol may have superior properties, such as hydrolysis resistance, weather resistance and heat resistance.

As the polyol compound, perfluoropolyether or polytetrafluoroethylene may be used as the fluorine-based polyol for improving fouling resistance and frictional coloration.

As the polyol compound, the ester-based polyol may be an aliphatic polyester polyol obtained by an esterification reaction of polyol such as ethylene glycol (EG), 1,4-butanediol (1,4-BD), 1,6-hexanediol (1,6-HD), neopentyl glycol (NPG) and diethylene glycol (DEG), with polycarboxylic acid such as adipic acid (AA). Alternatively, the ester-based polyol may be polyester polyol obtained by a ring-opening polymerization reaction of a cyclic ester compound such as ε-caprolactone and γ-valerolactone. Alternatively, the ester-based polyol may be aliphatic polyester polyol or a polyester polyol copolymer copolymerizing polyester polyol.

In addition, as the polyol compound used for polymerizing the polyurethane resin, at least one or more of flame retarding polyol such as reactive phosphoric acid ester-based polyol or polyetherester-based polyol may be further included.

Furthermore, the chain extender used for polymerizing the polyurethane resin may be a chain extender generally used in the related arts, and examples thereof may include one or more types selected from among ethylene glycol, propylene glycol, 1,4-butanediol, 1,6-hexanediol and methylpentanediol.

Meanwhile, the polyurethane skin layer (104) forming the synthetic leather of the present invention may have an average thickness of about 0.05 to 0.3 mm.

e) Polyurethane Surface Treatment Coating Layer (105)

The synthetic leather of the present invention may further include a polyurethane surface treatment coating layer (105) on the surface of the polyurethane skin layer (104) thereby controlling the degree of luster, and enhance fouling resistance.

The polyurethane surface treatment coating layer (105) may use a non-yellowing-type resin as a main raw material. In other words, the polyurethane surface treatment coating layer (105) may be formed by coating a surface treatment coating liquid including a non-yellowing-type polyurethane resin, a delusterant and a solvent on the surface of the polyurethane skin layer (104). The surface treatment coating liquid may further include a dispersant, an antioxidant, an antifoaming agent, a UV absorbing agent and the like commonly used in the art depending on the purpose.

The polyurethane resin included in the surface treatment coating liquid may be a polyurethane resin forming the polyurethane skin layer (104). In particular, a non-yellowing-type polyurethane resin prepared by polymerizing an isocyanate compound and a polyol compound including polycarbonate-based polyol, fluorine-based polyol and ester-based polyol may be included.

As the polyol compound used for polymerizing the polyurethane resin, polycarbonate-based polyol, fluorine-based polyol and ester-based polyol are preferably included in a weight ratio of about 70-95:about 1-10:about 1-20. Particularly, the polycarbonate polyol and the ester-based polyol may be selected and used as the polyol compound in order to enhance light resistance, heat aging resistance and chemical resistance of the surface treatment coating layer (105), and the fluorine-based polyol may be selected and used for enhancing fouling resistance.

The delusterant included in the surface treatment coating liquid may be a organic-based micropowder or inorganic-based micropowder. The organic-based micropowder may be selected from the group consisting of acrylic resin particles, styrene resin particles, styrene-acrylic resin particles, phenol resin particles, melamine resin particles, acrylic-polyurethane resin particles, polyurethane resin particles, polyester resin particles, nylon resin particles, silicone resin particles, polyethylene resin particles and mixtures thereof. In addition, the inorganic-based micropowder may be selected from the group consisting of talc, mica, calcium carbonate, barium sulfate, magnesium carbonate, mud, alumina, silica, carbon fiber, glass fiber, metal fiber, carbon black, titanium oxide, molybdenum, magnesium hydroxide, bentonite, graphite and mixtures thereof. Particles having an average particle diameter of about 10 μm or less may be used as such powder without limit. When the average particle diameter is greater than about 10 μm, scratch resistance may deteriorate when thin film coating is applied out on a product surface by dispersing the particles into the surface treatment coating liquid, which may cause a problem in product appearances. The content of the delusterant may be of about 1 to 10 parts by weight with respect to 100 parts by weight of the surface treatment coating liquid. When the content is less than about 1 part, an effect of quenching the luster may not be sufficient, and when the content is greater than about 10 parts, physical properties of the synthetic leather may be degraded. Accordingly, the delusterant may be used within the above-described range.

The solvent included in the surface treatment coating liquid may be selected from the group consisting of dimethylformamide, dimethyl sulfoxide, dimethyl acetamide, N-methylpyrrolidone, N-ethylpyrrolidone, methylethyl ketone, isopropyl alcohol and mixtures thereof. In addition, the content of the polyurethane resin for surface treatment in the surface treatment coating liquid using the solvent may be of about 3 to 60% by weight based on the total weight of the polyurethane surface treatment coating layer. When the content of the resin is less than about 3% by weight, a film-forming property and frictional coloration may deteriorate, and when the content of the resin is greater than about 60% by weight, formation of the film may not be sufficient after drying, and the organic solvent may remain on the film.

Meanwhile, the surface treatment coating layer (105) forming the synthetic leather of the present invention may have an average thickness of about 0.01 to 0.02 mm.

In another aspect, the present invention provides a method for preparing synthetic leather for a steering wheel cover of a vehicle. The method may comprise: preparing a first sheet by forming an urethane porous layer (102) having micropores on a fiber base layer (101) including a microfiber nonwoven fabric; forming a polyurethane skin layer (104) by coating a polyurethane composition including a polyurethane resin prepared by polymerizing an isocyanate compound and a polyol compound including polycarbonate-based polyol, fluorine-based polyol and ester-based polyol on a release paper; preparing a second sheet by forming an adhesive layer on the skin layer (104); and peeling off the release paper after laminating the first sheet and the second sheet.

The method for preparing the synthetic leather according to the present invention is described in more detail by each step as follows.

i) First Sheet Preparation

A first sheet may be prepared by forming an urethane porous layer (102) having micropores on a fiber base layer (101) including a microfiber nonwoven fabric.

In particular, a first sheet may be prepared by using a microfiber nonwoven fabric having apparent density of about 0.35 g/cm$^3$ or greater, of about 0.35 to 0.8 g/cm$^3$, or particularly of about 0.4 to 0.5 g/cm$^3$ as a fiber base layer (101), and subsequently coating an urethane porous layer composition on a surface of the fiber base layer (101).

The microfiber nonwoven fabric may include a thermoplastic resin selected from the group consisting of polyamide (PA), polyethylene terephthalate (PET) and polytrimethylene terephthalate (PTT) as an island component, and include polylactic acid (PLA) having biodegradability as a sea component. Further, the microfiber nonwoven fabric may be prepared by using filament yarn formed from mixing the island component in an amount of about 60 to 80% by weight and the sea component in an amount of about 20 to 40% by weight, based on the total weight of the microfiber nonwoven fabric.

The urethane porous layer composition may include a polyurethane resin, a solvent, an urethane pore controlling agent and a toner in a weight ratio of about 100:about 30-60:about 0.5-2:about 0.1-1:about 5-15.

The polyurethane resin may be prepared by reacting a chain extender and a polyurethane prepolymer obtained from polymerizing an isocyanate compound, and a polyol compound containing polyester-based polyol having a weight average molecular weight of about 1,000 to 6,000, polyether-based polyol having a weight average molecular weight of about 1,000 to 6,000 and polycarbonate-based polyol having a weight average molecular weight of about 1,000 to 6,000. The polyol compound may be polyester-based polyol, polyether-based polyol and polycarbonate-based polyol in a weight ratio of about 10-60:about 20-80:about 5-60, or particularly, in a weight ratio of about 20-40:about 30-65:about 20-50 for enhancing hydrolysis resistance and chemical resistance.

An average thickness of the urethane porous layer (102) formed by coating the urethane porous layer composition may be in a range of about 0.1 to 0.4 mm.

ii) Polyurethane Skin Layer (104) Formation

A polyurethane skin layer (104) may be formed on a release paper by coating a polyurethane composition including a polyurethane resin prepared by polymerizing a polyol compound mixed in a specific composition ratio as described above.

The release paper may be provided with a paper or film material, and various types may be used, however, a material having a uniform thickness and high dimensional stability may be provided such that deformation may not occur by heat and pressure.

The polyurethane composition for forming the polyurethane skin layer (104) may include a polyurethane resin for forming a skin layer, a solvent and a toner. The polyurethane resin for forming a skin layer, the solvent and the toner may be described in the descriptions made in the urethane porous layer.

In particular, the polyurethane resin included in the polyurethane skin layer (104) may be prepared by reacting a chain extender and a polyurethane prepolymer obtained from polymerizing an isocyanate compound, and a polyol compound containing polycarbonate-based polyol having a weight average molecular weight of about 800 to 3500, fluorine-based polyol having a weight average molecular weight of about 200 to 4000 and ester-based polyol having a weight average molecular weight of about 1000 to 3000. The polyol compound may include the polycarbonate-based polyol, the fluorine-based polyol and the ester-based polyol in a weight ratio of about 70-95:about 1-10:about 1-20.

An average thickness of the polyurethane skin layer (104) formed by coating the composition for forming the skin layer may be in a range of about 0.05 to 0.3 mm.

iii) Second Sheet Preparation

A second sheet may be prepared by forming an adhesive layer (103) on the top of the polyurethane skin layer (104).

The adhesive may be an adhesive generally used in the related arts, but may not be particularly limited. For example, a two-part urethane adhesive may be added, and an urethane-based adhesive, or particularly, a phosphorous and a nitrogen series flame retardant may be added for providing adhesion and a flame retarding property for synthetic leather. The second sheet prepared as above may have a structure in which the polyurethane skin layer (104) and the adhesive layer (103) are laminated in consecutive order on the release paper.

iv) First Sheet and Second Sheet Lamination

The first sheet and the second sheet prepared above may be laminated and the release paper may be peeled off.

The first sheet in which the urethane porous layer (102) may be laminated on the fiber base layer (101) including a microfiber nonwoven fabric and further may be laminated with the second sheet having the adhesive layer of the second sheet therebetween, and then the release paper may be peeled off.

v) Polyurethane Surface Treatment Coating Layer (105) Formation

A polyurethane surface treatment coating layer for controlling the degree of luster may be formed by coating a surface treatment coating liquid on the surface of the skin layer from which the release paper is peeled off.

The surface treatment coating liquid may include a non-yellowing-type polyurethane resin, a delusterant and a solvent. The polyurethane resin included in the surface treatment coating liquid may be the polyurethane resin forming the polyurethane skin layer (104). The polyurethane resin may be prepared by reacting a chain extender and a polyurethane prepolymer obtained from polymerizing an isocyanate compound, and a polyol compound containing polycarbonate-based polyol having a weight average molecular weight of about 800 to 3500, fluorine-based polyol having a weight average molecular weight of about 200 to 4000 and ester-based polyol having a weight average molecular weight of about 1000 to 3000. The polyol compound may include polycarbonate-based polyol, fluorine-based polyol and ester-based polyol in a weight ratio of about 70-95:about 1-10:about 1-20. Particularly, the polycarbonate polyol and the ester-based polyol may be used in the above-described content ratios in order to enhance light resistance, heat aging resistance and chemical resistance of the surface treatment coating layer (105), and the fluorine-based polyol may be used the above-described content ratio in order to enhance fouling resistance.

The solvent and the toner included in the surface treatment coating liquid may be prepared as described above.

An average thickness of the surface treatment coating layer (105) formed by coating the surface treatment coating liquid may be from about 0.01 to about 0.02 mm.

The coating for forming each layer using the method for preparing the synthetic leather described above may be carried out by generally known coating methods in the related arts, but may not be particularly limited. Exemplary methods may be an air knife method, a gravure method, a reverse roll method, a reverse gravure method, a spray method, a slot die coating method, a blade method, an immersion method or a spray coating method, without limitation.

Still, in one aspect, a steering wheel cover material of a vehicle is provided and the steering wheel may be covered with the synthetic leather as described herein.

Figure 3:
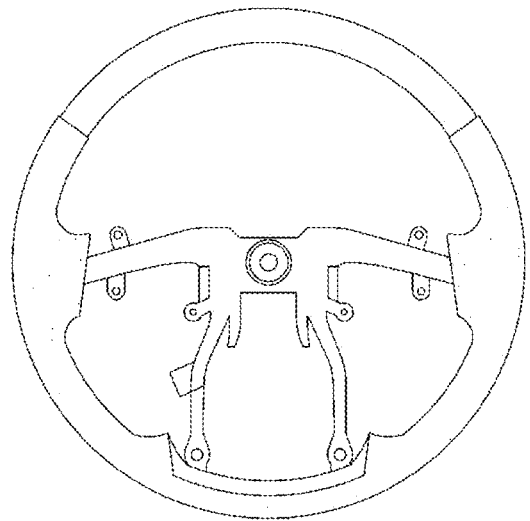
FIG. 3 illustrates an exemplary steering wheel manufactured using an exemplary synthetic leather prepared in Example 1 according to an exemplary embodiment of the present invention.
Figure 3:
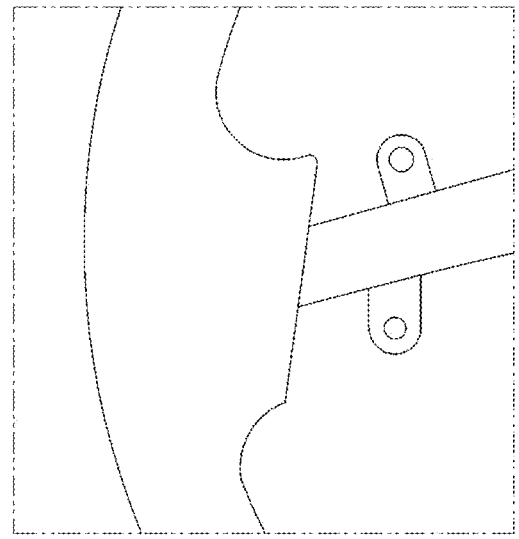
Figure 4:
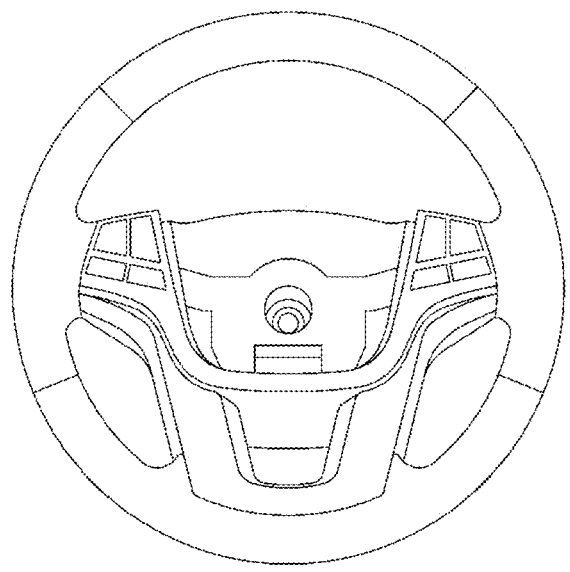
FIG. 4 illustrates an exemplary steering wheel manufactured using an exemplary synthetic leather prepared in Example 3 according to an exemplary embodiment of the present invention.

FIG. 3 and FIG. 4 further illustrate exemplary steering wheels manufactured using an exemplary synthetic leather according to an exemplary embodiment of the present invention. When these are compared with the synthetic leather of Comparative Example 1 shown in FIG. 5, the exemplary synthetic leather of the present invention may have improved durability, and particularly have improved excellent softness such as a wrinkle property and a volume property.

EXAMPLES

Hereinafter, preferred examples and test examples of the present invention are described. However, the following examples and test examples are described only for the purpose of clearly expressing the present invention, and the contents of the present invention are not limited to the following examples and test examples.

Example

Comparative Preparation Example 1: Preparation of Nonwoven Fabric for Fiber Base Layer An amount of about 50% by weight of polyester having fineness of about 1.4 dernier and a fiber length of 51 mm, and an amount of about 50% by weight of nylon having fineness of about 2 dernier and a fiber length of about 51 mm were prepared into a fabric of about 230 $g/m^2$ by needle punching for nonwoven fabric preparation method. The fabric was shrunk, and the weight was reduced for about 30 minutes in about 3% aqueous NaOH solution. The results are as shown in the following Table 1.

TABLE 1

| Category | Shrinkage | | After Weight Reduction |
|---|---|---|---|
| | Before | After | |
| Weight (g/m$^2$) | 230 | 310 | 248 |
| Thickness (mm) | 1.06 | 1.03 | 0.98 |
| Density (g/cm$^3$) | 0.21 | 0.30 | 0.25 |
| Surface Shrinkage Rate (%) | | 28 | |

As seen in Table 1, the density of the nonwoven fabric increased by about 41.9% from about 0.21 g/cm$^3$ to about 0.30 g/cm$^3$ after the shrinkage treatment. In addition, the surface shrinkage rate due to longitudinal and transverse shrinkage was about 28%. Even when the density increased due to shrinkage, density of about 0.3 g/cm$^3$ or greater was difficult to be obtained. In addition, the fiber was partly damaged after the weight reduction, and the density decreased to about 0.25 g/cm$^3$.

Preparation Example 1: Preparation of Fiber Base Layer of High-Density Microfiber Sea island-type (PET/Co-PET, 70/30, 25 islands) filament yarn having fineness of about 3 dernier was prepared into a microfiber nonwoven fabric having a width of about 1950 mm, an average weight of about 450 g/m$^3$ and an average thickness of about 1.13 mm using a spun bond or spun lace combined continuous process, and then the result went through a process of weight reduction for about 30 minutes in about 3% aqueous NaOH solution to prepare an exemplary microfiber nonwoven fabric. The results are shown in Table 2.

TABLE 2

| Category | | Weight Reduction | |
|---|---|---|---|
| | | Before | After |
| Weight (g/m$^2$) | | 450 | 410 |
| Thickness (mm) | | 1.13 | 0.98 |
| Density (g/m$^3$) | | 0.40 | 0.42 |
| Tensile Strength (kgf/inch) | MD | 45.0 | 44.5 |
| | CD | 55.5 | 55.0 |
| Elongation (%) | MD | 87 | 70 |
| | CD | 96 | 120 |
| Tear Strength (kgf) | MD | 5.7 | 5.75 |
| | CD | 5.5 | 5.40 |

MD: Machine Direction (Longitudinal Direction)
CD: Cross Direction (Transverse Direction)

As seen in Table 2, the microfiber nonwoven fabric according to an exemplary embodiment of the present invention had substantially increased apparent density compared to the density of general needle punching nonwoven fabric, e.g. about 0.21, and had the property of high-density even without a separate shrinkage process. In the microfiber nonwoven fabric, the density after weight reduction may be similar to the density before weight reduction even when heat, physical force or the like may be applied in a post process such as weight reduction due to a property of fiber going back to its original form, as such, stable high-density microfiber nonwoven fabric may be provided.

Comparative Preparation Example 2: Polyurethane Resin for Forming Urethane Porous Layer An amount of about 110 parts by weight of polyester polyol (K-340(EG/1.4BD/AA), a product of Dongsung Chemical Co., Ltd.) having an average molecular weight of about 2,000, an amount of about 50 parts by weight of polyether polyol (PTMEG 2000, a product of Korea PTG), an amount of about 15 parts by weight of ethylene glycol, an amount of about 100 parts by weight of a dimethylformamide (DMF) solvent were each introduced first into a reactor, and the result was stirred for about 1 hour while maintaining a temperature at about 50° C., and then an amount of about 80 parts by weight of 4.4'-diphenylmethane diisocyanate (MDI) was introduced thereto by dividing into 2 to 3 portions such that a rapid reaction did not occur. The polyol and the diisocyanate were reacted for about 6 hours such that the NCO/OH ratio became about 1.0 while maintaining the temperature at about 80° C. so as not to be overheated from a temperature increase due to the heat of the reaction. At a reactant temperature of about 75° C. or less, an amount of about 1 part by weight of methanol and an amount of about 190 parts by weight dimethylformamide (DMF) were introduced as a blocking agent to mask the NCO group, and the reaction was completed after confirming that no —NCO groups were present.

Next, an anti-yellowing agent and an antioxidant were added in an amount of about 0.3 parts by weight each in the above reaction process, and terminal NCO group-blocked general-type polyurethane for forming a urethane porous layer was prepared.

Preparation Example 2: Polyurethane Resin for Forming Urethane Porous Layer

With respect to 100 parts by weight of polyol including polyester polyol (K-340(EG/1.4BD/AA), a product of Dongsung Chemical Co., Ltd.) having an average molecular weight of about 2,000, polyether polyol (PTMEG 2000, a product of Korea PTG) having an average molecular weight of about 2,000 and polycarbonate polyol (T-6002, a product of Asahi Kasei Corporation, Japan) having an average molecular weight of about 2,000 in a weight ratio thereof about 30:50:20, an amount of about 16 parts by weight of ethylene glycol and an amount of about 270 parts by weight of dimethylformamide were each introduced first into a reactor, and the result was stirred for about 1 hour while maintaining a temperature at about 50° C., and then an amount of about 90 parts by weight of 4.4'-diphenylmethane diisocyanate (MDI) was introduced thereto by dividing into 3 portions and reacted such that a rapid reaction did not occur. The polyol and the diisocyanate were reacted for about 6 hours so that the NCO/OH ratio became about 1.0 while maintaining the temperature within a range of about 80° C. so as not to be overheated from a temperature increase due to the heat of the reaction. At a reactant temperature of about 70° C., an amount of about 0.01 parts by weight of methanol and an amount of about 270 parts by weight of dimethylformamide were introduced as a blocking agent with respect to 100 parts by weight of the polyol to mask the NCO group, and the reaction was completed after confirming that no —NCO groups were present. Then, a terminal NCO group-blocked polyurethane resin was prepared by adding an anti-yellowing agent and an antioxidant in an amount of about 0.3 parts by weight each, and a cell control agent in an amount of about 0.2 parts by weight in the above reaction process.

Preparation Example 3: Polyurethane Resin for Forming Urethane Porous Layer

A polyurethane resin composition was prepared in the same manner as in Preparation Example 2, except that polyester polyol (K-340(EG/1.4BD/AA), a product of Dongsung Chemical Co., Ltd.) having an average molecular weight of about 2,000, polyetherpolyol (PTMEG 2000, a product of Korea PTG) having an average molecular weight of about 2,000, and polycarbonate polyol (T-6002, a product of Asahi Kasei Corporation, Japan) having an average molecular weight of about 2,000 were used in a weight ratio thereof about 20:30:50 as the polyol.

Comparative Preparation Example 3: Polyurethane Resin for Forming Skin Layer An amount of about 100 parts by weight of polycarbonate polyol (T-6002, a product of Asahi Kasei Corporation, Japan) having a weight average molecular weight of about 2,000, an amount of about 3 parts by weight of 1,4-butanediol, an amount of about 190 parts by weight of a dimethylformamide (DMF) solvent were each introduced first into a reactor, and the result was stirred for about 1 hour while maintaining a temperature at about 50° C., and then an amount of about 30 parts by weight of isophorone diisocyanate (IPDI) was introduced thereto by dividing into 2 to 3 portions so that a rapid reaction did not occur. The polyol and the diisocyanate were reacted for about 6 hours so that the NCO/OH ratio became about 1.0 while maintaining the temperature at about 80° C. so as not to be overheated from a temperature increase due to the heat of the reaction. At a reactant temperature of about 75° C. or less, an amount of about 1 part by weight of methanol, an amount of about 60 parts by weight of methylethyl ketone (MEK) and an amount of about 100 parts by weight of isopropyl alcohol (IPA) were introduced as a blocking agent to mask the NCO group, and the reaction was completed after confirming that no —NCO groups were present.

Next, an anti-yellowing agent and an antioxidant were added in an amount of about 0.3 parts by weight each in the above reaction process, and terminal NCO group-blocked polyurethane for forming a polycarbonate-type skin layer was prepared.

Preparation Example 4: Polyurethane for Forming Skin Layer

An amount of about 100 parts by weight of polycarbonate polyol (T-6002, a product of Asahi Kasei Corporation) having a weight average molecular weight of about 2,000, an amount of about 6 parts by weight of fluorine-based polyol (FC-502, a product of 3M Corporation) having a weight average molecular weight of about 580, an amount of about 10 parts by weight of ester-based polyol (K-340(EG/1.4BD/AA), a product of Dongsung Chemical Co., Ltd.) having a weight average molecular weight of about 2000, an amount of about 2 parts by weight of ethylene glycol, and an amount of about 90 parts by weight of a dimethylformamide (DMF) solvent were each introduced first into a reactor, and the result was stirred for about 1 hour while maintaining a temperature at about 50° C., and then an amount of 40.4 parts by weight of dicyclohexylmethane-4,4-diisocyanate ($H_{12}$MDI) was introduced thereto by dividing into 2 to 3 portions such that a rapid reaction did not occur. The polyol and the diisocyanate were reacted for about 2 hours. Then, an amount of about 10 parts by weight of isophorone diamine (IPDA) was introduced thereto by into 3 to 4 portions to increase the viscosity while maintaining the temperature at about 80° C. so as not to be overheated from a temperature increase due to the heat of the reaction. When suitable viscosity is obtained, an amount of about 1 part by weight of methanol, an amount of about 180 parts by weight of dimethylformamide (DMF), an amount of about 40 parts by weight of methylethyl ketone (MEK) and an amount of about 140 parts by weight of isopropyl alcohol (WA) were introduced as a blocking agent at a reactant temperature of about 75° C. or less to mask the NCO group, and the reaction was completed after confirming that no —NCO groups were present. Next, an anti-yellowing agent and an antioxidant were added in an amount of about 0.3 parts by weight each in the above reaction process, and terminal NCO group-blocked polyurethane for forming a skin layer was prepared.

A polyurethane skin coating liquid was prepared by mixing an amount of about 15 parts by weight of dimethylformamide, an amount of about 30 parts by weight of methylethyl ketone, an amount of about 15 parts by weight of a color developing toner, and then mixing the result for about 30 minutes using a high-speed stirrer. As an polyurethane adhesive solution, an adhesive composition was prepared by mixing an amount of about 100 parts by weight of an urethane adhesive (synthesis reaction product of polycarbonatepolyol/1,4-butylene glycol/toluene diisocyanate/methylene diisocyanate, about 70% solid content, about 80,000 to 100,000 cps/25), an amount of about 10 parts by weight of dimethylformamide and an amount of about 30 parts by weight of methylethyl ketone, and then adding an amount of about 13 parts by weight of a cross-linking agent thereto.

Preparation Example 5: Preparation of Surface Treatment Coating Liquid

A non-yellowing-type polyurethane resin having an amount of about 100 parts by weight of polycarbonate polyol (T-6002, a product of Asahi Kasei Corporation) having a weight average molecular weight of about 2,000, an amount of about 10 parts by weight of fluorine-based polyol (FC-502, a product of 3M Corporation) having a weight average molecular weight of about 580, an amount of about 5 parts by weight of ester-based polyol (K-340(EG/1.4BD/AA), a product of Dongsung Chemical Co., Ltd.) having a weight average molecular weight of about 2000, isophorone diisocyanate (IPDI) and 4,4-diaminodicyclohexylmethane ($H_{12}$MDI) as main raw materials was prepared. An amount of about 50 parts by weight of dimethylformamide (DMF), an amount of about 20 parts by weight of methylethyl ketone (MEK) and an amount of about 30 parts by weight of isopropyl alcohol (IPA) were introduced thereto with respect to 100 parts by weight of the non-yellowing-type a polyurethane resin, and the result was stirred at a low speed for about 2 hours at room temperature to prepare an urethane coating liquid having about 15% solid content. An amount of about 6 parts by weight of hydroxyl silicone-modified polyacrylate (BYK-SILCLEAN 3700, a product of BYK Korea), a reactive additive, was introduced thereto, and the result was stirred for about 1 hour, and then an amount of about 0.2 parts by weight of an antifoaming agent (BYK-066N, a product of BYK Korea), an amount of about 0.5 parts by weight of an antioxidant (Irganox 1135, a product of BASF) and an amount of about 0.15 parts by weight of an anti-yellowing agent (ZIKASORB BS, a product of ZIKO Ltd.) were introduced thereto, and the result was stirred. After that, an amount of about 0.5 parts by weight of silica (Deggusa TS-100) and an amount of about 1.0 part by weight of urethane beads (C-800T, a product of Doosung Chemis Corporation) were added in order and mixed thereto while stirring. After that, an amount of about 15 parts by weight of a melamine resin (CYMEL325, a product of Allnex) was introduced thereto and the result was stirred at a low speed for approximately about 20 minutes, and then an amount of about 20 parts by weight of p-toluene sulfonic acid, a reaction accelerator, was mixed thereto to prepare a surface treatment coating liquid.

Example 1: Preparation of Synthetic Leather

On the microfiber nonwoven fabric prepared in Preparation Example 1, a wet silver layer coating surface, on which an urethane microporous layer was formed by coating with a coating liquid for forming a porous layer including the polyurethane resin for forming an urethane porous layer prepared in Preparation Example 2, dimethylformamide, an urethane pore controlling agent (polyether-modified polysiloxane solution, BYK-L 9525, a product of Uni Trading Corporation), a surfactant (DISPERBYK-130, BYK Korea), a toner (SBW-7388-Black, a product of Ilsam Corporation) in a ratio of about 100:40:1:0.5:5 parts by weight and then going through a coagulation and a rinsing processes in an aqueous dimethylformamide, was formed, and the result was dried through a heat tenter to prepare a first sheet in which a fiber base layer—an urethane porous layer were laminated.

After that, the composition for forming a skin layer prepared in Preparation Example 4 was skin coated on a release paper to form a skin layer having a thickness of about 0.09 mm (as a thickness after drying), and then the result was dried for about 5 minutes at about 100° C. The two-part adhesive prepared in Preparation Example 4 was coated on the dried skin layer to form an adhesive layer having a thickness of about 0.12 mm (as a thickness after drying), and then a second sheet was prepared by curing the adhesive layer through applying heat for about 1 minute at about 90° C. Then, the first sheet in which the fiber base layer—the urethane porous layer were laminated prepared above was laminated to the adhesive layer of the second sheet, and the result was aged for about 48 hours while maintaining the temperature at about 80° C., and then synthetic leather was prepared by peeling off the synthetic leather laminated on the release paper.

Example 2: Preparation of Synthetic Leather

Synthetic leather was prepared in the same manner as in Example 1, except that the polyurethane resin for forming a porous layer prepared in Preparation Example 3 was used.

Example 3: Preparation of Synthetic Leather

About 20 g/m² of the surface treatment coating liquid prepared in Preparation Example 5 was coated on the synthetic leather of Example 1 using a gravure-coater, and then the result was dried for about 2 minutes at about 100° C.

Comparative Example 1: Preparation of Synthetic Leather

After preparing the fabric prepared in Comparative Preparation Example 1, the composition for forming a skin layer prepared in Comparative Preparation Example 3 was skin coated on a release paper to form a skin layer having a thickness of about 0.09 mm (as a thickness after drying), and then the result was dried for about 5 minutes at about 100° C. The two-part adhesive prepared in Comparative Preparation Example 3 was coated on the top of the dried skin layer to form an adhesive layer having a thickness of about 0.12 mm (as a thickness after drying), and then the result was cured by applying heat for about 1 minute at about 90° C. Then, the fabric prepared in Comparative Preparation Example 1 was laminated to the adhesive layer, and the result was aged for about 48 hours while maintaining the temperature at about 80° C., and then synthetic leather forming a skin layer on a conventional (short-fiber) microfiber fiber base was prepared by peeling off the synthetic leather laminated on the release paper.

Test Example

Test Example 1: Physical Property Measurements of Urethane Porous Layer

The polyurethane resin compositions prepared in Comparative Preparation Example 2, Preparation Example 2 and Preparation Example 3 were each prepared to a sheet form having an average thickness of about 0.25 mm through a wet process, and then the physical properties of the sheets were measured as follows, and the results are shown in the following Table 3.

Test Method (1) Tensile Properties: Tensile properties of the sheets were measured in guidance with KS M 6782, ASTM D-412 and JIS K7311.

(2) Heat Aging Resistance: The sheets were kept for about 168 hours in a convection oven maintaining a temperature at about 100±2° C., and tensile properties were measured as above.

(3) Hydrolysis Resistance: The sheets were preserved for 168 hours in saturated water vapor under a condition of about 70±2° C., about 98±2% RH in guidance with DIN EN ISO 2440, and then taken out and left unattended for about 1 hour at room temperature, and tensile properties were measured as above.

(4) Peel-off Strength: On both sides of the sheet, a hot-melt cloth tape having a width of about 25 mm was thermoset for about 5 seconds at about 130° C., and peel-off strength between the layers of the sheet was measured in guidance with KS M 0533 and JIS K 6854.

In the following Table 3, W means a width direction and L means a length direction.

TABLE 3

| Category | | | Comparative Preparation Example 2 | Preparation Example 2 | Preparation Example 3 |
|---|---|---|---|---|---|
| Tensile Properties | Modulus (Kg/cm²) | | 55 | 70 | 65 |
| | Tensile Strength (Kgf/cm²) | W | 350 | 380 | 390 |
| | | L | 400 | 420 | 430 |
| | Elongation (%) | W | 500 | 450 | 470 |
| | | L | 450 | 420 | 440 |
| After Heat | Modulus (Kgf/cm²) | | 48 | 67 | 64 |

TABLE 3-continued

| Category | | | Comparative Preparation Example 2 | Preparation Example 2 | Preparation Example 3 |
|---|---|---|---|---|---|
| Aging Resistance Test After | Tensile Strength (Kgf/cm$^2$) | W | 270 | 360 | 370 |
| | | L | 310 | 390 | 400 |
| | Elongation (%) | W | 460 | 420 | 450 |
| | | L | 410 | 410 | 420 |
| | Modulus (Kgf/cm$^2$) | | 45 | 68 | 64 |
| Hydrolysis Resistance Test | Tensile Strength (Kgf/cm$^2$) | W | 240 | 350 | 360 |
| | | L | 280 | 380 | 400 |
| | Elongation (%) | W | 440 | 430 | 450 |
| | | L | 400 | 410 | 420 |
| Peel-off Strength (Kgf/cm) | | | 2.6 | 3.0 | 3.3 |

When examining the physical property test results of the urethane porous sheets shown in Table 3, Preparation Example 2 and Preparation Example 3 obtained superior properties compared to Comparative Preparation Example 2 when the degree of physical property changes was compared after the hydrolysis resistance and the heat aging resistance tests.

Test Examples 2: Physical Property Measurements of Synthetic Leather Product

Physical properties of the synthetic leather prepared in Examples 1 to 3 and Comparative Example 1 were measured using the following methods, and the results are shown in the following Table 4.

[Test Method]

(1) Light Resistance

After irradiation with about 126 MJ/m$^2$ at a black panel temperature of about 90° C. and inside humidity of about 50% RH using a tester defined according to ISO 105, the difference in discoloration was determined with the naked eye using a grey scale defined in ISO 105-A02, and grades were given.

(2) Heat Aging Resistance

The sheets were kept for about 96 hours in a convection oven maintaining a temperature at about 140° C., and then the difference in discoloration was determined with the naked eye using a grey scale defined in ISO 105-A02, and grades were given.

(3) Frictional Coloration

The test piece was fixed on a test board of a friction tester (friction tester type-II for color fastness of JIS L 0823), and a friction wheeler of the tester was covered with white cotton cloth and fixed. After traveling the surface of the test specimen back and forth for about 100 times with a load of about 4.9N (about 500 gf), back and forth traveling speed of about 30 times/minute and traveling distance of about 100 mm, the degree of contamination of the white cotton cloth was determined by grey scale for contamination (grey scale for assessing staining of JIS L 0805) and grades were given. In addition, white cotton cloth was immersed in an artificial sweat solution for about 10 minutes, the cloth was slightly squeezed, and friction tests were carried out for determination. The artificial sweat solution was prepared by mixing an amount of about 8 g of class 1 or higher of JIS K 9019 (sodium phosphate dodecahydrate), an amount of about 8 g of class 1 or higher of JIS K 8150 (sodium chloride) and an amount of about 5 g of class 1 or higher of JIS K 8355 (glacial acetic acid) in pure water to have a volume of about 1 L at pH about 4.5.

(4) Chemical Resistance

After wiping the skin surface back and forth for about 10 times using a gauze wetted by sufficiently coating a test solution (an alkalescent glass cleaner, a mixed liquid comprising about 95% (vol/vol) distilled water and about 5% (vol/vol) neutral detergent, a mixed liquid comprising about 50% (vol/vol) isopropyl alcohol and about 50% (vol/vol) distilled water, unleaded gasoline), the result was left unattended for 1 hour at room temperature, and the difference in discoloration was determined with the naked eye using a grey scale defined in ISO 105-A02, and grades were given.

(5) Constant Load Elongation 5 test pieces each having a width of about 50 mm and a length of about 250 mm were taken from a longitudinal direction, and 5 test pieces each having a width of about 50 mm and a length of about 250 mm were taken from a transverse direction, and a mark line with a distance of about 100 mm was drawn at the center part. The test pieces were mounted in a fatigue tester with a clamp distance of about 150 mm, and a load of about 78.4N (about 8 kgf) (including the load of the underbody clamp) was applied. The test pieces were left unattended for about 10 minutes as the load was applied, and a distance between the mark lines were obtained.

Constant load Elongation (%)=$Lo$−100    [Mathematical Equation 1]

(In Mathematical Equation 1, Lo refers to a distance (mm) between the mark lines after applying a load of about 8 kgf and leaving as it is for about 10 minutes)

(6) Softness

Softness such as a volume property and feel was evaluated based on a test method in guidance with EN ISO 17235.

TABLE 4

| Category | | Comparative Example 1 | Example 1 | Example 2 | Example 3 |
|---|---|---|---|---|---|
| Color Fastness to Light, degree | | 2.5 to 3 | 3 to 4 | 3 to 4 | Class 4 or Higher |
| Dry/Wet Frictional Coloration | | Class 3 | Class 4 or Higher | Class 4 or Higher | Class 4 or Higher |
| Chemical Resistance, Degree | | Class 3 | Class 4 or Higher | Class 4 or Higher | Class 4 or Higher |
| Heat Aging Resistance | | 3.5 or Lower | Class 4 or Higher | Class 4 or Higher | Class 4 or Higher |
| Fouling Resistance | | 25% or Greater | 25% or Less | 20% or Less | 17% or Less |
| Constant Load Elongation (%) | W | 29 | 20 | 18 | 19 |
| | L | 6 | 9 | 8 | 9 |
| Wrinkle Property | | Poor | Favorable | Favorable | Favorable |
| Softness Such as Feel | | 3.0 (Δ) | 3.4 (⊚) | 3.4 (⊚) | 3.6 (⊚) |

(Δ): Softness such as a volume property and feel was poor after being made to a product
(⊚): Softness such as a volume property and feel was outstanding after being made to a product As shown in Table 4, the synthetic leather of Examples 1 and 2 of the present invention had improved properties in light resistance, chemical resistance, heat aging resistance and the like compared to Comparative Example 1, and softness such as a volume property and feel was superior showing similar tendency with natural leather texture.

Particularly, when the constant load elongation in the transverse direction was about 25% or higher, sew holes sagged during sewing, and form stability was reduced when used for a long period of time.

Figure 5:
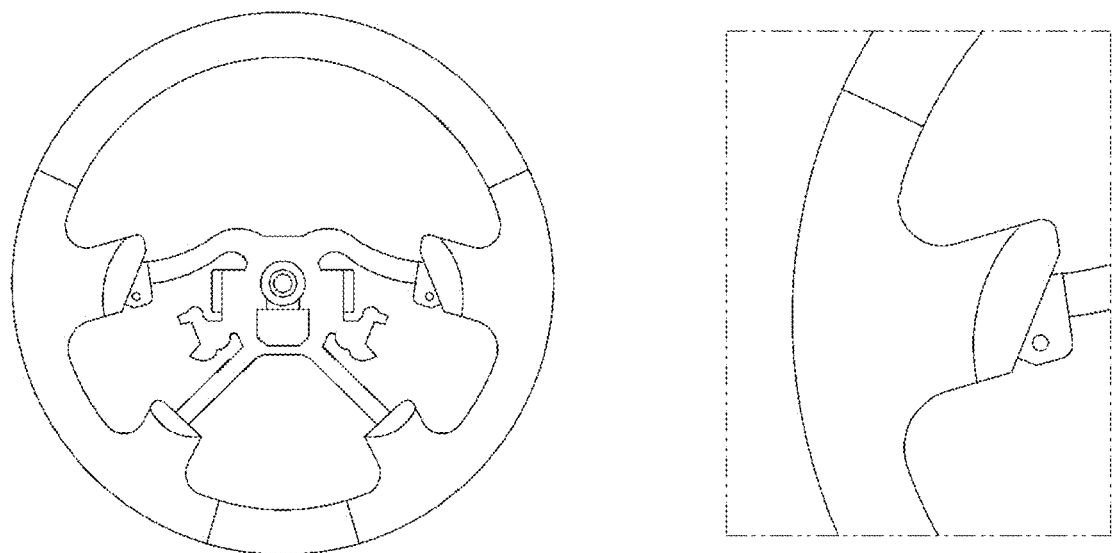
FIG. 5 illustrates a steering wheel manufactured using a synthetic leather prepared in Comparative Example 1 of the present invention.

Meanwhile, FIG. 3 illustrates an exemplary steering wheel manufactured using an exemplary synthetic leather prepared in Example 1 of the present invention, FIG. 4 illustrates an exemplary steering wheel manufactured using an exemplary synthetic leather prepared in Example 3 of the present invention, and FIG. 5 illustrates a steering wheel manufactured using the synthetic leather prepared in Comparative Example 1. As shown in FIG. 3 and FIG. 4 Example 1 and Example 3 may obtain substantial seam strength and a wrinkle property in curved parts compared to Comparative Example 1 shown in FIG. 5.

According to the present invention, effects of improving softness such as a volume property and a wrinkle property may be obtained while improving durability such as light resistance, heat aging resistance, frictional coloration, chemical resistance and fouling resistance, which are physical properties required for vehicle interior materials, particularly, steering wheel rim covers.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A synthetic leather for a steering wheel cover, comprising:
    a fiber base layer containing a microfiber nonwoven fabric;
    a urethane porous layer having micropores;
    a polyurethane skin layer including a polyurethane resin prepared by polymerizing an isocyanate compound and a polyol compound including a polycarbonate-based polyol, a fluorine-based polyol and an ester-based polyol; and
    a urethane adhesive layer including an urethane-based adhesive for adhering the urethane porous layer and the polyurethane skin layer;
    wherein the fiber base layer, the urethane porous layer, the urethane adhesive layer and the polyurethane skin layer are laminated in consecutive order.

2. The synthetic leather for a steering wheel cover of claim 1, wherein, on a surface of the skin layer, a polyurethane surface treatment coating layer including the polyurethane resin prepared by polymerizing the isocyanate compound and the polyol compound including the polycarbonate-based polyol, the fluorine-based polyol and the ester-based polyol is further laminated.

3. The synthetic leather for a steering wheel cover of claim 2, wherein the polyol compound of the polyurethane surface treatment coating layer includes the polycarbonate-based polyol having a weight average molecular weight of about 800 to 3500, the fluorine-based polyol having a weight average molecular weight of about 200 to 4000 and the ester-based polyol having a weight average molecular weight of about 1000 to 3000.

4. The synthetic leather for a steering wheel cover of claim 3, wherein the polyol compound of the polyurethane surface treatment coating layer includes the polycarbonate-based polyol, the fluorine-based polyol and the ester-based polyol in a weight ratio of about 70-95:about 1-10:about 1-20.

5. The synthetic leather for a steering wheel cover of claim 1, wherein the microfiber nonwoven fabric has apparent density of about 0.35 to 0.8 g/cm$^3$.

6. The synthetic leather for a steering wheel cover of claim 1, wherein the microfiber nonwoven fabric includes a thermoplastic resin selected from the group consisting of polyamide (PA), polyethylene terephthalate (PET) and polytrimethylene terephthalate (PTT) as an island component, and includes polylactic acid (PLA) having biodegradability as a sea component, wherein the island component is included in an amount of about 60 to 80% by weight based on the total weight of the microfiber nonwoven fabric and the sea component is included in an amount of about 15 to 40% by weight based on the total weight of the microfiber nonwoven fabric.

7. The synthetic leather for a steering wheel cover of claim 1, wherein the polyurethane resin included in the urethane porous layer is prepared by polymerizing the isocyanate compound, and the polyol compound containing a polyester-based polyol having weight average molecular weight of about 1,000 to 6,000, a polyether-based polyol having a weight average molecular weight of about 1,000 to 6,000 and the polycarbonate-based polyol having a weight average molecular weight of about 1,000 to 6,000.

8. The synthetic leather for a steering wheel cover of claim 7, wherein the polyol compound includes the polyester-based polyol, the polyether-based polyol and the polycarbonate-based polyol in a weight ratio of about 10-60:about 20-80:about 5-60.

9. The synthetic leather for a steering wheel cover of claim 1, wherein the polyol compound of the polyurethane skin layer includes the polycarbonate-based polyol having a weight average molecular weight of about 800 to 3500, the fluorine-based polyol having a weight average molecular weight of about 200 to 4000 and the ester-based polyol having a weight average molecular weight of about 1000 to 3000.

10. The synthetic leather for a steering wheel cover of claim 9, wherein the polyol compound of the polyurethane skin layer includes the polycarbonate-based polyol, the fluorine-based polyol and the ester-based polyol in a weight ratio of about 70-95:about 1-10:about 1-20.

11. A steering wheel that comprises a synthetic leather of claim 1.

* * * * *